(Model.)

H. B. SWARTZ.
ANIMAL TRAP.

No. 296,085.

2 Sheets—Sheet 1.

Patented Apr. 1, 1884.

Inventor
Hiram B Swartz

WITNESSES

Attorney (Model.)
H. B. SWARTZ.
ANIMAL TRAP.
No. 296,085. Patented Apr. 1, 1884.
2 Sheets—Sheet 2.
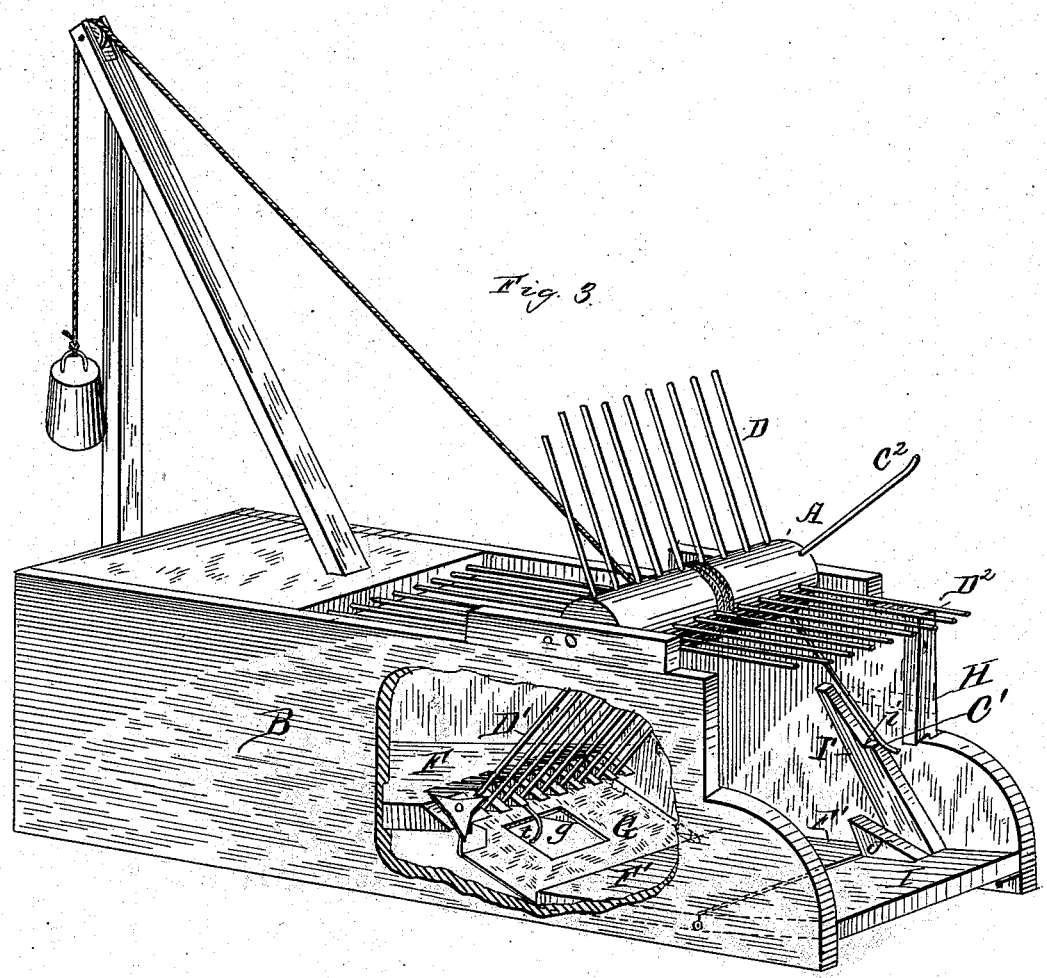
Fig. 3.
Fig. 4.
Witnesses
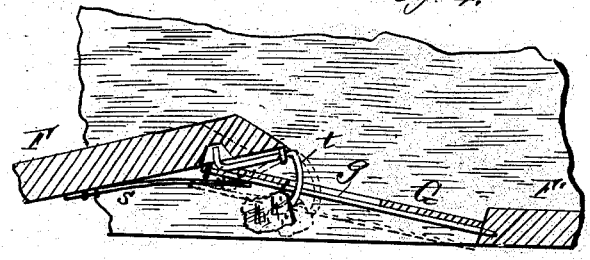
Inventor:
Hiram B. Swartz
Attorney

UNITED STATES PATENT OFFICE.

HIRAM B. SWARTZ, OF WOOSTER, OHIO.

ANIMAL-TRAP.

SPECIFICATION forming part of Letters Patent No. 296,085, dated April 1, 1884.

Application filed June 14, 1883. (Model.)

*To all whom it may concern:*

Be it known that I, HIRAM B. SWARTZ, a citizen of the United States of America, residing at Wooster, in the county of Wayne and State of Ohio, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in self-setting animal-traps, which operate in such a manner as to preserve the bait and set itself, and it is designed more especially as an improvement upon my Patent No. 257,904, dated May 16, 1882. My invention in the present instance, relating to certain improvements in the construction of the trap, whereby the same is rendered more effective and the cost of manufacture is lessened, consists in the construction and combination of the parts, as will be hereinafter more fully set forth, and pointed out in the claims.

Figure 1:
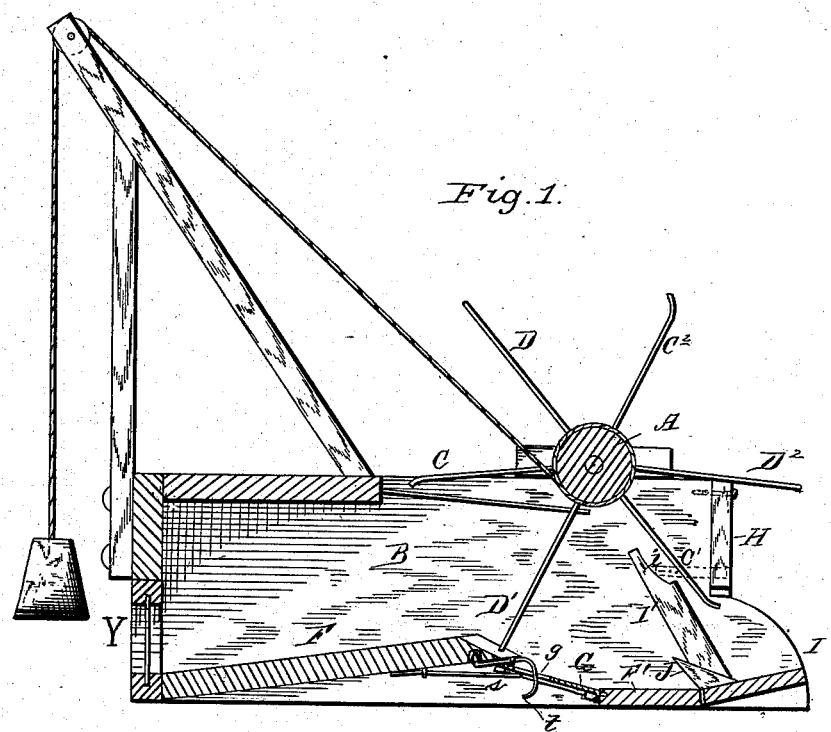
Figure 2:
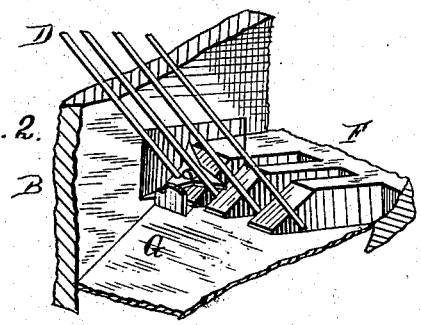

In the accompanying drawings, which illustrate my invention, Figure 1 is a vertical longitudinal section. Fig. 2 is a detailed perspective view, partly in section. Fig. 3 is a perspective view, partly in section; and Fig. 4 is an enlarged detail sectional view.

In my prior patent I employed a wheel having four spokes, the axle of which was provided intermediately with four arms. This construction I consider to be objectionable in some cases, as when four sets of spokes are used one of the sets will be inclined downwardly and will partly close the entrance to the trap, and their play is such that they do not receive sufficient momentum to force the animal into the trap. This objection is obviated in my present invention by reducing the number of rotating arms or spokes from four to three, so that when the trap is set the arms will project horizontally over the opening of the trap, and when the trap has been set sufficient momentum will be given to these radiating spokes to force the animal within the trap.

In the accompanying drawings, A represents an axle, which is mounted in suitable bearings attached to the upper edge of the two sides of the box-trap. Extending along the central portion of the axle A are three rows of wire spokes, D D' D², which project from the axle, as shown, and extend from the central portion of the axle to the floor of the trap, and at one end of the axle, between the spokes D D' D² and equidistant from each other, are three spokes, C C' C², which are set in a line with each other and are provided with bent ends. These spokes are of less length than the set of spokes indicated by the letters D D' D².

Adjacent to the front end of the box-trap is a spring and catch, H, as shown in the accompanying drawings, and fully described in my previous patent.

To the rear of the box B is secured a suitable standard having a roller, over which passes a weighted cord, which also passes around the axle, for the purpose of operating the spoked wheel.

To the rear of the trap is secured a suitable gate, Y, for removing the animal from the box.

The bottom of my improved trap, as indicated by the letter F, inclines from the rear of the box upwardly, while the board F' or bottom is parallel with the base. The bottom boards, F F', are rigidly attached to the sides of the box, and are provided at an intermediate portion with a hinged platform, G, which has a central perforation, $g$. This platform G is hinged by means of a suitable pintle to the edges of the boards F F', adjacent to one side of the box, and the end opposite this hinged portion is cut away and upturned, so as to provide a catch which will engage with a three-pointed wheel, which is secured above the same to the platform F.

Attached under the floor F, so as to project beyond the same, is a spring, $s$, which bears upon the under side of the central portion of the hinged platform G, which is pivoted at its lower end to the edge of the bottom F', and under the upper edge of the bottom F is a bait-hook, $t$, having an end which projects through the opening $g$ in the platform G, and is bent rearwardly, one end of this bait-hook entering a perforation in the floor F and extending slightly to the rear over the platform G. The upper projecting portion or catch which is formed on this platform is provided with a shoulder or point, which projects slightly upward, the parts of this catch adjacent to the shoulder being inclined, so as to provide an easy passage-way for the three-pointed wheel when the platform is depressed.

The pivoted board I at the front of the trap is provided with an arm, I', which inclines slightly rearward, and is provided at its upper portion with a catch, $i$, and to one side of this arm I' is secured a stop, J, which is triangular in shape, and is secured to the hinged board I immediately above its hinged portion. This triangle J serves as a stop when the platform I is tilted. The operation of this platform in connection with the arms may be described as follows: As soon as the trap is sprung, the side arms, C C', will strike against the upper end of the bar I', thereby tilting the board I and closing the entrance of the trap as the bars D project over the same. These bars are prevented from being pushed outwardly, as the curved arm on the side of the axle will catch within the depression $i$ and prevent such movement, while the stop J will prevent the platform from falling over, so as to engage with the arms C upon the wheel. The catch $i$ serves to prevent the wheel from being turned in a wrong direction when the trap is being set, and when the animal has passed within the same, so that the spoke at the side of the wheel shall have passed the pivoted lever I', as then this catch will engage with the spokes C and prevent them from being turned toward the entrance of the box.

When the trap is set, the spring-catch H, hereinbefore referred to, which is located upon the side of the box and is pressed inwardly by means of a suitable spring, will catch upon the outer end of the arms C and prevent the arms D from being pressed outwardly.

By providing a trap as hereinbefore described with inclined floors I provide a bait-receptacle under the trap, as will be fully understood by reference to the accompanying drawings.

Having thus described my invention, what I claim as new, and desire to secure by Letters Patent, is—

1. In an animal-trap having a self-setting wheel, the inclined floor F, connected to the floor F' by means of a pivoted platform having an opening formed therein, so as to provide a bait-receptacle and a bait-hook, the parts being organized and combined substantially as shown.

2. In an animal-trap, a wheel having spoke-arms, the raised floor F, and hinged platform G, provided with a retaining-spring and catches, in combination with a pivoted bait-hook which extends under the floor F, and is adapted to depress the platform G when drawn forward, substantially as shown.

3. In an animal-trap having a rotary spoked wheel, and means for setting and holding the same, the hinged platform G, which is held in a raised position by means of a spring, and provided with an opening through which passes a bait-hook, said platform adapted to be operated either by the weight of the animal or the movement of the bait-hook, the parts being combined and organized substantially as shown, and for the purpose set forth.

4. In a self-setting animal-trap, a rotating axle provided with means for operating the same, said axle having two series of spokes, D D' D² and C C' C², of different lengths projecting from the axle, as shown, the longer spokes being adapted to engage with a catch located upon the end of a raised platform, which catch is disengaged by the depression of a pivoted platform with a central opening, through which passes a bait-hook, $t$, the rear end of which bears upon the upper end of the pivoted platform, and the pivoted floor I, provided with an arm, I', with catch $i$ and triangular stop J, and spring-latch H, the parts being organized and combined substantially as shown, and for the purpose set forth.

In testimony whereof I affix my signature in presence of two witnesses.

HIRAM B. SWARTZ.

Witnesses:
 LUCAS FLATTERY,
 EUGENE A. HARTMAN.